United States Patent Office 3,133,049
Patented May 12, 1964

3,133,049
SOLID, STABLE DIAZONIUM COMPOUNDS
Hasso Hertel and Reinhard Mohr, Offenbach (Main), Germany, assignors to Farbwerke Hoechst Aktiengesellschaft vormals Meister Lucius & Brüning, Frankfurt am Main, Germany, a corporation of Germany
No Drawing. Filed Oct. 4, 1960, Ser. No. 60,290
Claims priority, application Germany Oct. 9, 1959
2 Claims. (Cl. 260—142)

The present invention relates to new solid, stable diazonium compounds and to a process for preparing the same; more particularly, it relates to solid, stable diazonium compounds corresponding to the following general formula:

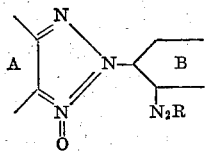

wherein A and B represent radicals of the benzene or naphthalene series, and —$N_2R$ represents the radical of a diazonium salt.

We have found that solid, stable diazonium compounds are obtained by diazotizing in known manner amines corresponding to the general formula:

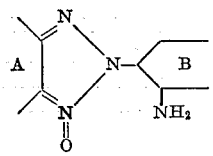

wherein A and B represent radicals of the benzene or naphthalene series and separating the diazonium compounds in solid form in a manner known in itself.

The new diazonium compounds may be separated, for example, as diazonium chlorides, diazonium phosphates, diazonium sulfates, diazonium arylsulfonates, diazonium tetrafluoroborates or diazonium chloride-metal chloride double salts. They, generally, possess a good solubility and an extraordinarily high stability, properties which are independent or substantially independent of the mode of separation but depend on the special constitution of the compounds used as starting material.

After storage for 4 weeks at 40° C., which is standard for the stability of those compounds, the compounds obtained according to the invention show no decrease in the content of pure substance. After storage for several months at 40° C. or even 50° or 60° C., no substantial decrease in the content of pure substance is observed. Even mixtures of the new diazonium compounds with such metal salts as generally decompose diazonium compounds with evolution of nitrogen, for example with copper salts, possess a good stability when stored in the hot.

The following table shows the results obtained by the storage in the hot of several diazonium compounds:

| Diazonium compound | Conditions of storage | Decrease in the content of pure substance in percent of the initial value |
|---|---|---|
| Diazonium-naphthalene-1, 5-disulfonate of 2-(2'-amino-4'-methoxy-5'-methylphenyl)-benztriazole-1-oxide. | 30 days, 60° C. | 2.5 |
| Diazonium-naphthalene-1, 5-disulfonate of 2-(2'-amino-4'-methoxy-5'-methylphenyl)-benztriazole-1-oxide and copper sulfate (molar ratio 1:1.5). | 30 days, 50° C. | 0.6 |
| Diazonium tetrafluoroborate of 2-(2'-amino-4'-methoxy-5'-methylphenyl)-benztriazole-1-oxide. | 30 days, 40° C. | 0 |
| Diazonium tetrafluoroborate of 2-(2'-amino-4'-methoxy-5'-methylphenyl)-benztriazole-1-oxide with copper sulfate (molar ratio 1:1.5). | ----do---- | 0 |
| Diazonium sulfate of 2-(2'-amino-4'-methoxy-5'-methylphenyl)-benztriazole-1-oxide. | ----do---- | 0 |
| Diazonium sulfate of 2-(2'-amino-4'-methoxy-5'-methylphenyl)-benztriazole-1-oxide with copper sulfate (molar ratio 1:1.5). | ----do---- | 0 |
| Diazonium chloride-zinc chloride double salt of 2-(2'-amino-4'-methoxy-5'-methylphenyl)-benztriazole-1-oxide. | 60 days, 40° C. | 0.4 |
| Diazonium chloride-zinc chloride double salt of 2-(2'-amino-4', 5'-diethoxyphenyl)-6-methylbenztriazole-1-oxide. | 30 days, 60° C. | 1.1 |
| Diazonium chloride-zinc chloride double salt of 2-(2'-amino-4'-methoxy-5'-acetylaminophenyl)-6-methylbenztriazole-1-oxide. | 130 days, 40° C. | 2.0 |
| Diazonium chloride-zinc chloride double salt of 2-(2'-amino-4'-methoxy-5'-acetylaminophenyl)-6-methylbenztriazole-1-oxide and copper sulfate. | 60 days 40° C. | 0 |
| Diazonium chloride-zinc chloride double salt of 2-(2'-amino-4'-acetylamino-5'-methylphenyl)-6-methylbenztriazole-1-oxide. | 130 days, 40° C. | 2.8 |
| Diazonium chloride-zinc chloride double salt of 2-(2'-amino-4'-methoxy-5'-acetylaminophenyl)-benztriazole-1-oxide. | 120 days, 40° C. | 1.6 |
| Diazonium chloride of 2-(2'-amino-4'-methoxy-5'-benzoylaminophenyl)-benztriazole-1-oxide and copper sulfate. | 30 days, 50° C. | 0 |

The new diazonium compounds represent valuable intermediate products for the manufacture of azo dyestuffs.

As starting compounds for the process according to the invention, amines having the above formula are used in which the benzene or naphthalene radicals A and B may contain halogen atoms, trihalogen alkyl, alkyl, aryl, alkoxy, aryloxy, cyano, carboxylic acid amide, carboxylic acid ester, sulfonic acid amide, sulfonic acid ester, alkylsulfonic, arylsulfonic, alkylamino, arylamino, acylamino or acyl groups. These compounds are obtained, for example, according to the process described in U.S. patent application Ser. No. 13,710, 1960.

The following examples serve to illustrate the invention but they are not intended to limit it thereto, the parts being by weight unless otherwise stated and the relationship of parts by weight to parts by volume being the same as that of the kilogram to the liter:

*Example 1*

270 parts of 2-(2'-amino-4'-methoxy-5'-methylphenyl)-benztriazole-1-oxide are stirred with 1500 parts by volume of water and converted into the hydrochloride by adding 1200 parts by volume of hydrochloric acid of 20° Bé. and stirring for an hour. After having added ice, the batch is diazotized in the usual manner by introducing 200 parts by volume of a 5 N-sodium-nitrite solution. Then, a solution of 350 parts of the sodium salt of naphthalene-1.5-disulfonic acid in 3500 parts by volume of water are added to the clear red-brown diazonium solution obtained, whereby the diazonium naphthalene-1.5-disulfonate is precipitated in the form of light-yellow crystals, the precipitation being completed by adding 1000 parts of sodium chloride. The crystalline precipitate is suction-filtered, washed with a 15% solution of sodium chloride and dried at 40° C.

*Example 2*

348.5 parts of 2-(2'-amino-4',5'-diethoxyphenyl)-6-chlorobenztriazole-1-oxide are introduced, while cooling, into 400 parts of concentrated sulfuric acid. 304 parts of nitrosylsulfuric acid of 41.9% strength are added dropwise, the temperature being maintained below 50° C. by external cooling and regulation of the dropping rate. Then, the batch is stirred for 1 hour and poured on to ice. By adding sodium sulfate the diazonium sulfate is precipitated, suction-filtered and dried. It represents a light-yellow crystalline powder.

*Example 3*

270 parts of 2-(2'-amino-4'-methoxy-5'-methylphenyl)-benztriazole-1-oxide are diazotized as described in Example 1. The solution of diazonium chloride is diluted with water to 6000 parts by volume; after having added an aqueous solution of 110 parts of sodium borofluoride, the diazonium fluoroborate precipitates in the form of red crystals, the precipitation being completed by adding sodium chloride. Then, the precipitate is suction-filtered, washed with a 15% solution of sodium chloride and dried at 40° C.

*Example 4*

327 parts of 2-(2'-amino-4'-methoxy-5'-acetylaminophenyl)-6-methyl-benztriazole-1-oxide are stirred with 700 parts by volume of water. Then, 1200 parts by volume of hydrochloric acid of 20° Bé. are added. As soon as the hydrochloride has formed, ice is added and the batch is diazotized with 200 parts by volume of an aqueous 5 N-sodium nitrite solution. The diazonium solution is diluted with water to 6000 parts by volume; then, an aqueous solution of 75 parts of zinc chloride is slowly added dropwise. The diazonium chloride-zinc-chloride double salt precipitates in the form of red crystals, the precipitation being completed by adding sodium chloride. The precipitate is suction-filtered, washed with a 15% solution of sodium chloride and dried at 40° C.

*Example 5*

375 parts of 2-(2'-amino-4'-methoxy-5'-benzoylaminophenyl)-benztriazole-1-oxide are stirred with 1200 parts by volume of hydrochloric acid of 20° Bé. As soon as the hydrochloride has completely formed, ice is added and the batch is diazotized by dropping in 200 parts by volume of a 5 N-sodium nitrite solution. The diazonium chloride precipitates. It is suction-filtered and dissolved in 20,000 parts by volume of water of 50° C. By external cooling the clarified solution is cooled to room temperature, whereby the diazonium chloride is precipitated in yellow-red crystals, the precipitation being completed by adding 2000 parts of sodium chloride. The diazonium chloride is suction-filtered, washed with a 15% solution of sodium chloride and dried at 40° C.

We claim:
1. The solid stable diazonium compounds having the following formula

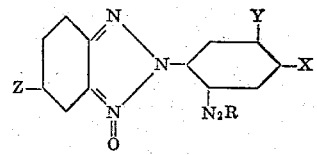

wherein X and Y represent members selected from the group consisting of methyl, methoxy, ethoxy, acetylamino and benzoylamino, Z represents a member selected from the group consisting of hydrogen, chlorine, methyl and methoxy, and N₂R represents a radical selected from the group consisting of diazonium chloride, diazonium sulfate, diazonium tetrafluoroborate, diazonium naphthalene disulfonate and diazonium chloride-zinc chloride.

2. The solid stable diazonium compound having the formula

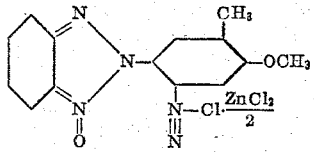

References Cited in the file of this patent

UNITED STATES PATENTS

| | | |
|---|---|---|
| Re. 17,306 | Laska et al. | May 28, 1929 |
| 1,342,134 | Schedler | June 1, 1920 |
| 2,501,188 | Parker et al. | Mar. 21, 1950 |